United States Patent [19]
Gurtler

[11] Patent Number: 4,785,564
[45] Date of Patent: Nov. 22, 1988

[54] ELECTRONIC NOTEPAD

[75] Inventor: Richard W. Gurtler, Mesa, Ariz.

[73] Assignee: Motorola Inc., Schaumburg, Ill.

[21] Appl. No.: 450,876

[22] Filed: Dec. 20, 1982

[51] Int. Cl.$^4$ .............................................. G09F 9/00
[52] U.S. Cl. ..................................... 40/448; 340/707; 340/765; 340/784
[58] Field of Search ............... 340/708, 707, 784, 718, 340/719, 758, 759, 760, 763, 765, 706–708, 784; 40/446–448, 542, 446; 315/169.1

[56] References Cited

U.S. PATENT DOCUMENTS

| | | | |
|---|---|---|---|
| 3,944,988 | 3/1976 | Mayer | 340/707 |
| 4,224,615 | 9/1980 | Penz | 340/784 |
| 4,266,164 | 5/1981 | Schizoeder | 315/169.1 |
| 4,318,096 | 3/1982 | Thornburg et al. | 340/706 |
| 4,345,248 | 8/1982 | Togashi et al. | 340/707 |
| 4,405,921 | 9/1983 | Mukaiyama | 340/708 |
| 4,423,929 | 1/1984 | Gomi | 350/335 |

FOREIGN PATENT DOCUMENTS

| | | | |
|---|---|---|---|
| 11824 | 1/1977 | Japan | 340/707 |
| 127225 | 10/1979 | Japan | 340/707 |
| 28146 | 2/1980 | Japan | 340/707 |
| 147229 | 11/1981 | Japan | 340/707 |
| 166543 | 12/1981 | Japan | 340/707 |
| 152033 | 9/1982 | Japan | 340/707 |
| 8002302 | 11/1981 | Netherlands | 340/707 |

Primary Examiner—Gene Mancene
Assistant Examiner—J. Hakomaki
Attorney, Agent, or Firm—Joe E. Barbee; Raymond J. Warren

[57] ABSTRACT

An electronic notepad comprises a wire/display area for receiving and displaying graphic information, a control for the device and a keyboard for entering information and/or instructions. Two types of liquid crystal display arrays, both fabricated on a semiconductor substrate with logic cells and reflector/field electrodes thereon are described. Further, two methods of sensing the position of a stylus are described whereby a user may enter graphic information directly into the notepad.

3 Claims, 3 Drawing Sheets

ELECTRONIC NOTEPAD

FIELD OF THE INVENTION

The present invention relates, in general, to an electronic device for receiving graphic input by means of a stylus or otherwise, for electronically storing graphic information and for displaying graphic information. More particularly, the present invention relates to an electronic notepad.

BACKGROUND OF THE INVENTION

Miniaturization of electronic devices has allowed the introduction of ever increasing amounts of computing power in hand-held form. Both numerical and alphabetical information can be manipulated by hand-held devices. However, graphic information such as hand-written notes and sketches have not been susceptible to electronic manipulation, largely due to the lack of an efficient hand-held interface between the graphic and electronic domains. If graphic input could be reduced to electronic form effectively by a hand-held device, present electronic technologies would allow for storage, manipulation, communication and display of the information.

SUMMARY OF THE INVENTION

Accordingly, it is an object of the present invention to provide an electronic notepad for receiving, storing, manipulating and displaying graphic information.

It is a further object of the present invention to provide a write/display technology compatible with a hand-held device for receiving graphic input and converting it to electronic form.

A particular embodiment of the present invention comprises an electronic notepad of a size comparable to a large hand-held calculator with a keyboard area and a write/display area approximately 4 inches by 4 inches. The write/display area is made up of approximately 40,000 liquid crystal display elements, each individually controlled by a logic cell. The logic cells are fabricated on a silicon substrate which also forms the substrate for the LCD array and are addressed by row and column lines which run on the substrate in the spaces between the LCD elements.

In a preferred embodiment of the present invention, graphic input is received by means of a grid of crossed row and column lines disposed under a flexible upper surface of the write/display area and normally separated by a layer of insulating liquid. The pressure of a stylus causes localized connection between row and column lines which is sensed by internal electronics, which activate the indicated logic cell or cells.

In an alternative embodiment, each logic cell includes a light sensitive device such as a photodiode and writing is accomplished with a light pen.

In either case movement of graphic information to and from an internal memory, erasing and other functions are controlled from the keyboard. The notepad also has an internal controller, such as a microprocessor, for controlling the various functions of the device and may include an interface to allow communication with other electronic devices.

These and other objects and advantages of the present invention will be apparent to one skilled in the art from a reading of the detailed description below taken together with the drawings.

DETAILED DESCRIPTION OF THE INVENTION

Figure 1:
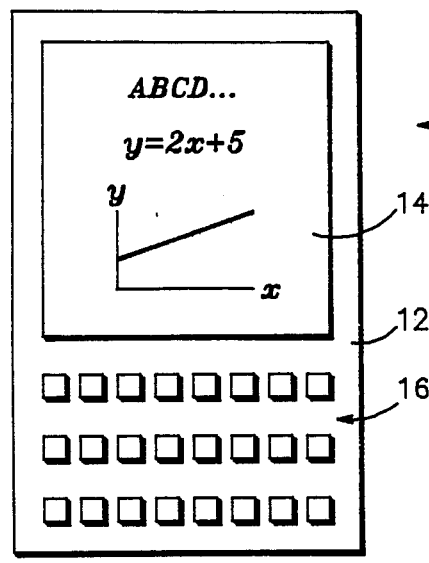
FIG. 1 is a top plan view of an electronic notepad according to the principles of the present invention.

Referring to FIG. 1, an electronic notepad 10 comprises a housing 12, a write/display area 14 and a keyboard area 16. As described below with reference to a preferred embodiment, a write/display area approximately 4 inches by 4 inches is presently envisioned, thus making the entire unit hand-holdable. However, larger write/display areas, e.g. approximately 8½ inches by 11 inches, can be utilized. It is not intended that FIG. 1 be to scale, or that the relative proportions of the elements thereof be in any way limiting to the scope of the present invention.

Write/display area 14 is capable of displaying graphic information such as lettering, arithmetic expressions and sketches with a resolution of approximately 50 lines per inch, although variation is allowable depending on the quality of display required and memory limitations. A 4 inch by 4 inch write/display area with a resolution of 50 lines per inch has 40,000 display elements, or pixels. If each pixel has an "on" and an "off" state, then at least 25 pages of graphic information can be stored in one megabit of memory, which is commercially available. Data manipulation techniques, such as storing a straight line as a point, a direction and a length, may extend the number of pages capable of being stored in a given amount of memory. Thus, a hand-holdable notepad is capable of storing sufficient graphic information to be useful.

Figure 2:
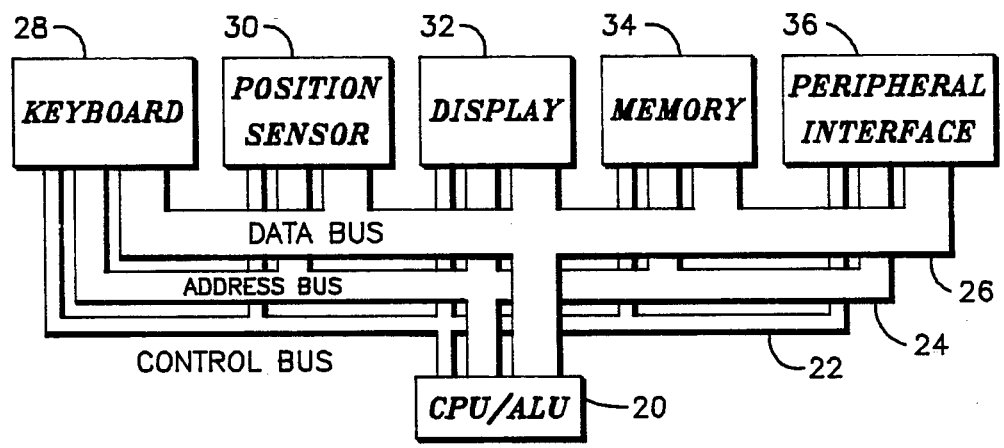
FIG. 2 is a block diagram of the major components of an electronic notepad and the interconnections therebetween.

Referring to FIG. 2, the basic components of an electronic notepad are shown. A central processing unit/arithmetic logic unit 20 performs control and calculation functions and is coupled to each of the other components by a control bus 22 and address bus 24, and a data bus 26. The other components comprise a keyboard 28, a position sensor 30, a display 32, a memory 34, and a peripheral interface 36. As is described in detail below, position sensor 30 determines the position of a stylus (not shown) relative to display 32. Either through CPU/ALU 20 or directly, this information is transmitted to display 32, whereby the corresponding display elements, or pixels, are activated. As shown below, position sensor 30 overlies display 32 so that the user appears to be writing on display 32. This process may be reversed by striking an erase key on keyboard 28, whereby display elements indicated by position sensor 30 are inactivated.

Once the desired information is written on display 32, it may be transferred to memory 34 under control of keyboard 28 and CPU/ALU 20 for later recall to display 32. In addition, it is possible to enter alphabetic or numeric information through keyboard 28, to operate on it with CPU/ALU 20 and to display it on display 32. In this manner, the device acts as a hand-held calculator. Other capabilities may be added through the use of peripheral interface 36. For instance, additional external memory may be utilized and library modules containing specialized information may be accessed. Further internal capabilities such as time-keeping, calendar-keeping and alarm functions may also be added. With the addition of A/D converters and associated interface electronics, it is possible to convert the notepad to a handheld oscilloscope.

Figure 3:
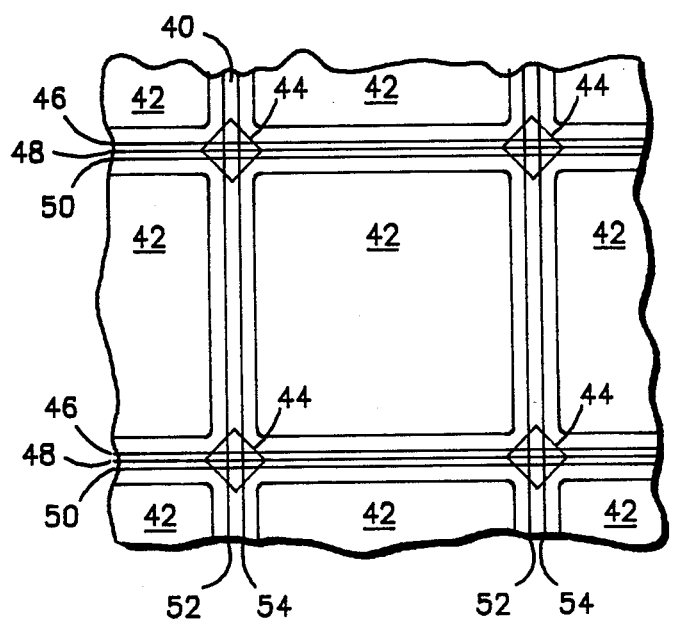
FIG. 3 is a top plan view of a portion of a liquid crystal display array.

Referring now to FIG. 3, a portion of a write/display device is shown in top plan view. One means suitable for realizing the write/display area required for the present invention is liquid crystal technology. In the reflective type of LCD, light enters the top layer, is polarized in a first direction, has its polarization rotated by 90° by a twisted liquid crystal layer, passes through a second polarizer rotated 90° from the first direction, is reflected from a bottom layer and passes up through all of the layers to exit the display. An LCD is turned on by creating an electric field which alters the twist of the liquid crystal layer to eliminate the 90° rotation previously supplied by the liquid crystal layer, thus creating a dark area. The electrical characteristics of LCD's have generally prevented matrix addressing of a large, high resolution LCD array such as is required for the present invention. The apparatus of FIG. 3 solves this problem.

FIG. 3 depicts the bottom layer of an LCD array. A semiconductor substrate 40, which may be silicon or the like, is overlaid with a plurality of reflector/field electrodes 42, which consist of a reflective metal layer deposited on substrate 40. Each electrode 42 is insulated from contact with semiconductive silicon by an undoped polysilicon tub as is described with reference to FIG. 4. Electrodes 42 are arranged in a regular array with space therebetween. For instance, each may be 18 mils on a side and they may be on 20 mil centers. As is apparent, the arrangement of electrodes 42 controls the ultimate resolution of the display. Each electrode 42 is electrically coupled to a logic cell 44 which is fabricated by any of a number of familiar techniques in substrate 40 at an intersection of the lines separating adjacent electrodes 42. Each logic cell 44 is coupled to two address lines 46 and 48 which run along substrate 40 between electrodes 42 in a horizontal direction, to a first signal line 52 and an address line 54 which run along substrate 40 between electrodes 42 in a vertical direction, and to a second signal line 50 running parallel to address lines 46 and 48. Address lines 46, 48 and 54 are operative to command logic cell 44 to apply one or the other of the signals on signal lines 50 and 52 to electrode 42, thus determining whether the LCD element is on or off. The design of logic cell 44 is subject to wide variation and a particular circuit is shown in FIG. 5. The basic apparatus shown in FIG. 3 when combined with a multi-layer LCD apparatus and a position sensor provides the write/display functions described above.

As is apparent, fabrication of the apparatus described amounts to making an integrated circuit with a die size of approximately 4 inches by 4 inches which would seem to present significant yield problems. However, the electrodes and conductive lines may have some degree of imperfections such as pinholes without affecting performance due to their relatively large size. Furthermore, the logic cells have an area of approximately 5 mils$^2$ which is sufficient to allow substantial redundancy in the design which can be utilized to improve yield by eliminating defective parts by laser or similar techniques.

Figure 4:
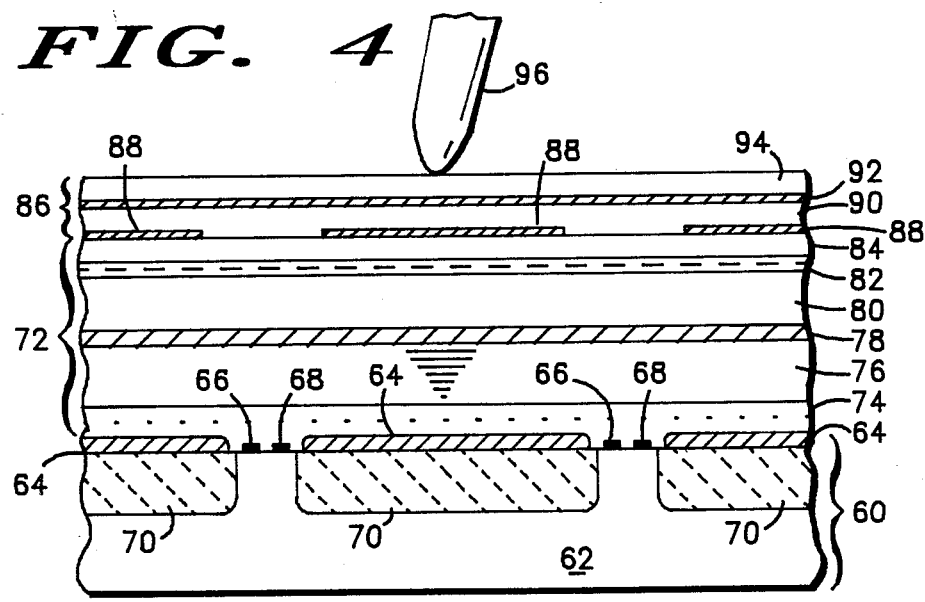
FIG. 4 is a cross-sectional view of a portion of a liquid crystal display array.
Figure 5:
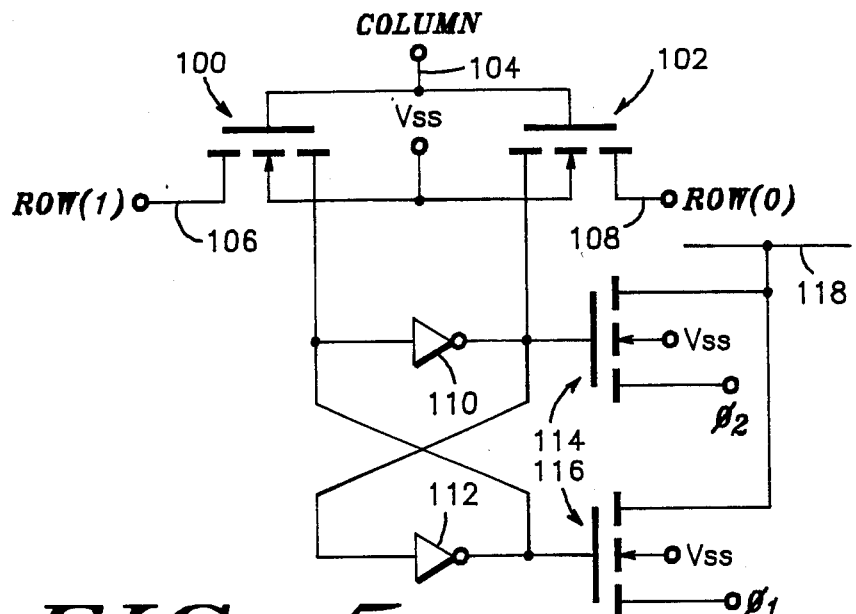
FIG. 5 is a schematic diagram of a logic cell for use with a liquid crystal display array.

Referring now to FIG. 4, a cross-sectional view of an LCD array utilizing the apparatus of FIG. 3 is shown. Substrate apparatus 60 comprises semiconductor substrate 62, reflector/field electrodes 64, signal lines 66 and 68 and address lines and logic cells (not shown). In addition, each electrode 64 is insulated from substrate 62 by a polysilicon tub 70. Other insulators such as $SiO_2$ may also be used in tubs 70. Overlying substrate apparatus 60 is a multi-layer LCD apparatus 72 comprising a quarter-wavelength birefringent film 74, a twisted nematic liquid crystal layer 76, a transparent electrode layer 78, a glass layer 80, a polarizing film 82, and an upper layer 84 of glass or plastic. Quarter-wavelength film 74, which can be a stressed plastic film, serves to rotate the polarization of light by 45°. This is preferred to the more common polarizing layer because it allows a minimum distance between transparent electrode layer 78 and electrodes 64 thus maximizing the voltage applied to liquid crystal layer 76. Liquid crystal layer 76 comprises a layer of nematic liquid crystal molecules with a 45° twist in orientation between quarter-wave layer 74 and transparent electrode layer 78. Conventional techniques such as high angle of incidence evaporation of SiO are used to establish alignment of the liquid crystal molecules at the surfaces. Transparent electrode layer 78 comprises a transparent conductive material such as InSnO. Layer 78 is a single electrode since the display elements are defined by reflector/field electrodes 64. Overlying glass layer 80 is a conventional polarizing film 82. Since film 82 is above transparent electrode 78, its thickness is not as crucial as that of quarter-wave layer 74. Finally, a top layer 84 of glass or plastic overlies polarizing film 82.

Light passing through polarizer 82 is polarized with an axis of polarization coincident with the axis of the liquid crystal molecules at the upper edge of layer 76. The polarization axis of the light is then rotated by 45° in passage through liquid crystal layer 76, arriving at birefringent film 74 with an axis of polarization parallel to the optic axis of film 74. Therefore, no alteration of the polarization axis occurs as the light passes through film 74 and is reflected from reflector/field electrodes 64. The polarization axis is again rotated by 45° by liquid crystal layer 76, so it coincides the axis of polarizer 82 and exits the apparatus.

Upon application of a voltage, preferably a square wave, between transparent electrode 78 and a reflector/field electrode 64, the polarization axis of the light passing through the effected region of liquid crystal layer 76 is not rotated. Therefore, the light reaching birefringent film 74 is polarized at 45° with respect to the axis of film 74. As is well known, this will result in a total of 90° of rotation during the two passes through film 74 if the thickness corresponds to one-quarter wavelength. Since the light is again uneffected by liquid crystal layer 76, it reaches polarizing film 82 with an axis of polarization perpendicular to the axis of polarizer 82, resulting in a darkened region approximately corresponding to the dimensions of reflector/field electrode 64. This type of LCD will perform best if one of the layers, for instance glass plate 80, performs a filtering function to restrict the light passing through to frequencies near the design frequency of quarter-wave birefringent film 74.

Overlying liquid crystal apparatus 72 is a position sensing apparatus 86 comprising a first plurality of transparent conductive lines 88 arranged in a parallel fashion on top layer 84, an insulating medium 90, a second plurality of transparent conductive lines 92 arranged in a parallel fashion perpendicular to lines 88, and an upper flexible plastic layer 94. Lines 88 and 92 are normally separated by medium 90, preventing current flow. When pressure is applied to layer 94 by a stylus 96 layer 94 is indented, thus providing localized contact between one or more of lines 92 and one or more of lines 88. This contact is sensed by the device controller, which activates (or deactivates if the erase key has been pressed) the indicated display element or elements. The advantage of this method of position sensing is that any stylus may be used as opposed to the method disclosed below which requires a light pen. As before, transparent conductors 88 and 92 are preferably InSnO. Medium 90 may be distilled water although many other media may be used for purposes of index matching.

Referring now to FIG. 5, a logic cell for use with the apparatus of FIG. 4 is shown in schematic form. A first field effect transistor (FET) 100 and a second FET 102 have their respective gates and substrates coupled together. Both FET's are N-channel, enhancement type MOSFET's with substrates coupled to common or $V_{SS}$. A column line 104 is coupled to the gates of FET's 100 and 102, a row (1) line 106 is coupled to the source of FET 100 and a row (0) line 108 is coupled to the source of FET 102. Lines 104, 106 and 108 are the address lines which control the state of the logic cell. The drain of FET 100 is coupled to the input of a first inverter 110 and to the output of a second inverter 112, while the drain of FET 102 is coupled to the output of inverter 110 and to the input of inverter 112. The output of inverter 110 is coupled to the gate of a third N-channel, enhancement type MOSFET 114 and the output of inverter 112 is coupled to the gate of a fourth N channel, enhancement type MOSFET 116. The substrates of FET's 114 and 116 are also coupled to common or $V_{SS}$. The drains of FET's 114 and 116 are coupled together and to a reflector/field electrode 118. A first signal voltage $\phi_1$ is coupled to the source of FET 116 and a second signal voltage $\phi_2$ is coupled to the source of FET 114. Signals $\phi_1$ and $\phi_2$ are square-wave signals with a 180° phase difference therebetween. Signal $\phi_1$ is also coupled to transparent electrode 78 (FIG. 4).

The logic cell is set to a first state, corresponding to an off state of the associated display element, by applying positive voltages to column line 104 and row (1) line 106, while row (0) line 108 is driven low or is in a high impedance state. A positive voltage is applied to the gate of FET 116 and signal $\phi_1$ is coupled to reflector/field electrode 118. Since signal $\phi_1$ is applied to both the transparent electrode and the reflector/field electrode no voltage is applied across the liquid crystal layer. The logic cell is set to a second state, corresponding to an on state of the associated display element, by applying positive voltages to column line 104 and row (0) line 108, while row (1) line 106 is driven low or is in a high impedance state. A positive voltage is applied to the gate of FET 114 and the signal $\phi_2$ is coupled to reflector/field electrode 118. Since the signals applied to the transparent electrode and the reflector/field electrode are now 180° out of phase, a voltage is applied across the liquid crystal layer and the element is turned on. Once the logic cell is set to a particular state, column line 104 is held low to prevent further interaction with the cell, while the state is maintained by coupled inverters 110 and 112. The logic cell shown here is one of many ways to perform the same function and the choice of the particular circuit and even the fabrication technology (such as CMOS, Bipolar, etc.) is left to the individual designer.

Figure 6:
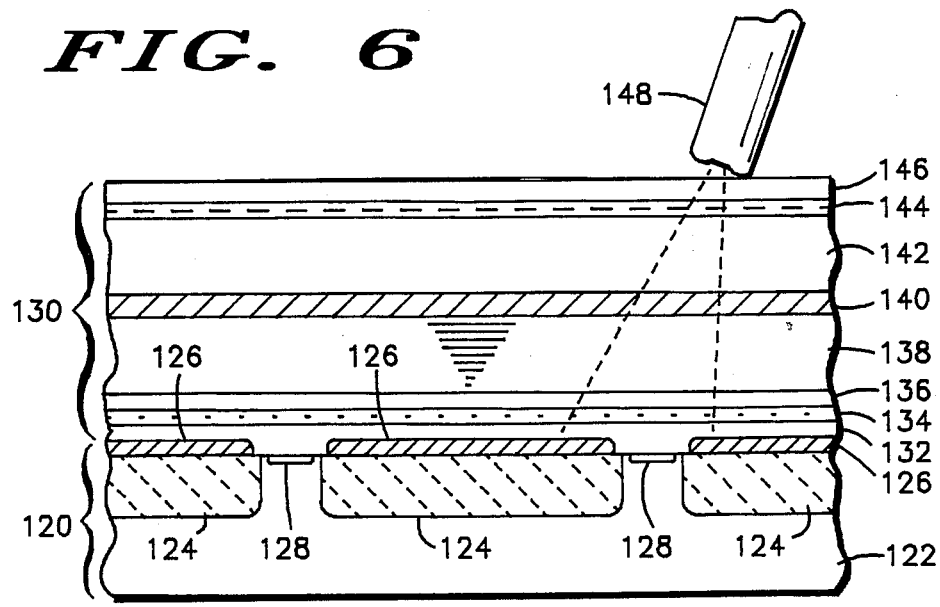
FIG. 6 is a cross-sectional view of a portion of a liquid crystal display array.

Referring now to FIG. 6, a cross-sectional view of an alternate write/display apparatus is shown. Substrate apparatus 120 comprises semiconductor 122, polysilicon tubs 124, reflector/field electrodes 126, logic cells 128 and address and signal lines (not shown). All these elements are substantially as described above except for a difference in logic cells 128 to be described below. Overlying substrate apparatus 120 is a multi-layer liquid crystal apparatus 130. Immediately overlying substrate 122 and reflector/field electrodes 126 is a passivating/planarizing layer 132 which can be a polyimide layer deposited by means of a spray and cured by heat. Overlying layer 132 is a polarizing film 134. To minimize its thickness, polarizing film 134 preferably does not include the glass or plastic sandwich which comes with commercial polarizers. Following film 134 is another passivating layer 136, which may also be polyimide, the purpose of which is to avoid interface problems between the liquid crystal layer and polarizing film 134. Overlying layer 136 is a liquid crystal layer 138 comprising nematic liquid crystal molecules having a 90° twist in orientation between the upper and lower surfaces of the layer, the orientation at the lower surface of layer 138 being parallel to the axis of polarizer 134. Following liquid crystal layer 138 is a transparent electrode layer 140, which is a single layer of a transparent conductor such as InSnO. Next is a glass layer 142, a polarizing film 144 and an upper layer 146 of glass or plastic. The polarization axis of polarizer 144 is parallel to that of the upper surface of liquid crystal layer 138. The operation of liquid crystal apparatus 130 is the same as conventional reflective mode liquid crystal displays with crossed polarizers separated by a 90° twisted layer of liquid crystal molecules.

The position sensing apparatus of FIG. 6 comprises a photodiode included in logic cells 128. As is apparent, if the circuit of FIG. 5 is utilized, a photodiode coupled to a positive voltage source and switch means under the control of the device controller to couple the photodiode to row (0) line 108 (for writing) or to row (1) line 106 (for erasing) will provide the necessary function. A light pen 148 emits light to which the photodiodes are sensitive, whereby display elements are turned on or off. To provide sufficient intensity to activate the small area photodiodes required, it may be necessary to utilize a pulsed light emitting diode in light pen 148. The choice of the particular light source, photodiode and logic cell circuit must be left to the individual designer. Of course, the position sensing apparatus of FIG. 6 may also be used in combination with the multi-layer liquid crystal apparatus of FIG. 4 and vice versa.

Figure 7:
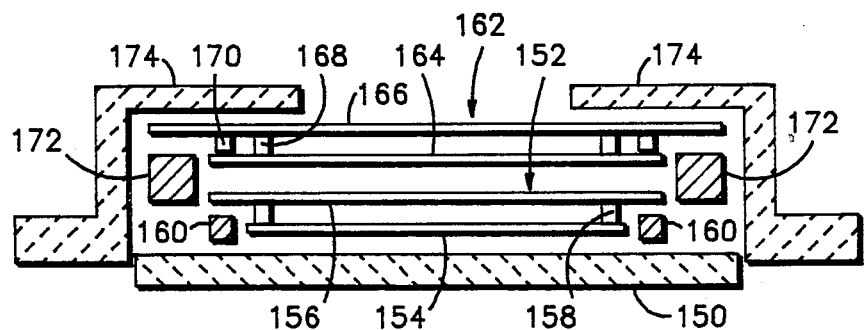
FIG. 7 is a cross-sectional view of a write/display apparatus according to the present invention showing packaging and interconnection details.

Referring now to FIG. 7, a cross-sectional view of a write/display apparatus according to the present invention, several packaging and interconnection details are described. A semiconductor substrate 150 carries the reflector/field electrodes, logic cells, and address and signal lines. It is also possible to integrate the CPU/ALU and other elements onto substrate 150 to simplify interconnections. A liquid crystal display apparatus 152 having a lower layer 154, an upper layer 156 and seals 158 overlies substrate 150. The transparent electrode extends beyond seals 158 on upper layer 156 to be electrically coupled to substrate 150 by means of elastomeric connectors 160. Connectors 160 are single conductor strips as is familiar in the art. Overlying apparatus 152 is a position sensing apparatus 162 comprising a lower layer 164, an upper layer 166, seals 168 and connectors 170. Connectors 170 are multi-conductor elastomeric strips which are also familiar in the art. Position sensing apparatus 162 is electrically coupled to substrate 150 by means of multi-conductor elastomeric connector strips 172. Brackets 174 overlap the edges of the entire apparatus and apply the compressive force needed to accomplish the indicated interconnections. FIG. 7 is drawn slightly exploded in the vertical dimension for clarity. In operation, brackets 174 compress all of the elements of the write/display apparatus into contact.

Several variations on the invention as disclosed bear mention. First, if power consumption is not a critical factor, light emitting diodes may be substituted for the LCD apparatus disclosed, offering easy matrix addressing and the possibility of providing both the display and position sensing functions with one device. Another variation involved the erase function. It is possible to utilize an "area erase" function wherein an erase key is acitvated, a closed figure is described using the stylus or light pen, and everything within the figure is automatically erased.

While the invention has been particularly shown and described with reference to a preferred and an alternate embodiment thereof, it will be understood by those skilled in the art that various other modifications and changes may be made to the present invention without departing from the spirit and scope thereof.

I claim:

1. A liquid crystal display comprising:
   a semiconductor substrate;
   an array of reflector/field electrodes disposed on said substrate;
   a logic cell associated with each electrode, said logic cell being switchable between first and second states and being capable of maintaining either of said first and second states;
   address lines and signal lines on said substrate between said electrodes and coupled to said logic cells;
   a multi-layer liquid crystal apparatus on said substrate; and
   position sensing means coupled to said logic cells through said lines for sensing a position of a stylus with respect to said array and for activating indicating ones of said logic cells, said position sensing means comprising:
   a lower layer;
   a first plurality of conductive lines arranged in a parallel fashion on said lower layer;
   a flexible layer separated from said lower layer by an insulating medium; and
   a second plurality of conductive lines arranged in a parallel fashion on an upper layer, said second plurality of lines being substantially perpendicular to said first plurality of lines, whereby pressure from said stylus on said upper layer causes localized contact between said conductive lines, said positioned sensing means being disposed on a top layer of said liquid crystal apparatus.

2. A liquid crystal display comprising:
   a semiconductor substrate;
   an array of reflector/field electrodes disposed on said substrate;
   a logic cell associated with each said electrode, said logic cell being switchable between first and second states and being capable of maintaining either of said first and second states;
   address lines and signal lines on said substrate between said electrodes and coupled to said logic cells; and
   a multi-layer liquid crystal apparatus on said substrate, said multi-layer liquid crystal apparatus comprising:
   a quarter wavelength birefringent film overlying said substrate and reflector/field electrodes;
   a twisted nematic liquid crystal layer overlying said film, said liquid crystals having a 45° twist;
   a transparent electrode layer overlying said liquid crystal layer;
   a glass layer overlying said transparent electrode layer; a polarizing film overlying said glass layer; and a top layer overlying said polarizing film.

3. A liquid crystal display according comprising:
   a semiconductor substrate;
   an array of reflector/field electrodes disposed on said substrate;
   a logic cell associated with each said electrode, said logic cell being switchable between first and second and being capable of maintaining either of said first and second states;
   address lines and signal lines on said substrate between said electrodes and coupled to said logic cells; and
   a multi-layer liquid crystal apparatus on said substrate, said multi-layer liquid crystal apparatus comprising:
   a passive/planarizing layer overlying said substrate and said reflector/field electrodes;
   a polarizing film overlying said passive/planarizing layer;
   an insulating film overlying said polarizing film;
   a twisted nematic liquid crystal overlying said insulating film, said liquid crystals having a 90° twist;
   a transparent electrode layer overlying said liquid crystal layer;
   a glass layer overlying said electrode layer;
   a polarizing film overlying said glass layer; and
   a top layer overlying said polarizing film.

* * * * *

UNITED STATES PATENT AND TRADEMARK OFFICE
CERTIFICATE OF CORRECTION

PATENT NO. : 4,785,564

DATED : Nov. 22, 1988

INVENTOR(S) : Richard W. Gurtler

It is certified that error appears in the above-identified patent and that said Letters Patent is hereby corrected as shown below:

Column 7, Claim 1, line 55, change "indicating" to -- indicated --.

Column 8, Claim 1, line 9, change "positioned" to -- position --.

Signed and Sealed this

Twenty-eighth Day of March, 1989

Attest:

DONALD J. QUIGG

Attesting Officer

Commissioner of Patents and Trademarks